US008876968B2

(12) United States Patent
Revil et al.

(10) Patent No.: US 8,876,968 B2
(45) Date of Patent: Nov. 4, 2014

(54) CEMENT COMPOSITION BASED ON CALCIUM ALUMINATE CEMENT

(75) Inventors: Phillippe Revil, Viuz la Chiesaz (FR); Hong Peng, Kristiansand (CN)

(73) Assignee: Elkem AS, Oslo (NO)

( * ) Notice: Subject to any disclaimer, the term of this patent is extended or adjusted under 35 U.S.C. 154(b) by 0 days.

(21) Appl. No.: 14/116,154

(22) PCT Filed: Sep. 26, 2011

(86) PCT No.: PCT/NO2011/000271
§ 371 (c)(1),
(2), (4) Date: Dec. 5, 2013

(87) PCT Pub. No.: WO2012/165966
PCT Pub. Date: Dec. 6, 2012

(65) Prior Publication Data
US 2014/0109799 A1 Apr. 24, 2014

(30) Foreign Application Priority Data
Jun. 1, 2011 (NO) .................................. 20110804

(51) Int. Cl.
C09K 8/46 (2006.01)
C04B 28/06 (2006.01)
C04B 14/06 (2006.01)
C04B 22/16 (2006.01)
C09K 8/467 (2006.01)
C09K 8/48 (2006.01)
C04B 103/40 (2006.01)
C04B 111/00 (2006.01)
C04B 111/70 (2006.01)

(52) U.S. Cl.
CPC . *C09K 8/46* (2013.01); *C04B 28/06* (2013.01); *C09K 8/467* (2013.01); *C09K 8/48* (2013.01); *C04B 2103/408* (2013.01); *C04B 2111/00431* (2013.01); *C04B 2111/0075* (2013.01); *C04B 2111/70* (2013.01)
USPC .......................................... 106/692; 106/696

(58) Field of Classification Search
CPC ...... C04B 14/06; C04B 14/062; C04B 14/24; C04B 14/303; C04B 14/368; C04B 16/0633; C04B 18/082; C04B 20/002; C04B 22/16; C04B 24/06; C04B 28/06; C04B 2103/408; C04B 2111/00431; C04B 2111/0075; C04B 2103/20; C09K 8/46; C09K 8/467; C09K 8/48
USPC ................................................. 106/692, 696
See application file for complete search history.

(56) References Cited

U.S. PATENT DOCUMENTS

| 5,226,961 | A | * | 7/1993 | Nahm et al. | 106/692 |
| 5,269,845 | A | * | 12/1993 | Grunau et al. | 106/692 |
| 5,976,240 | A | | 11/1999 | Vezza | |
| 6,060,535 | A | * | 5/2000 | Villar et al. | 166/293 |
| 6,395,662 | B1 | * | 5/2002 | Li et al. | 501/127 |
| 7,147,055 | B2 | * | 12/2006 | Brothers et al. | 166/293 |
| 7,255,739 | B2 | * | 8/2007 | Brothers et al. | 106/694 |
| 8,076,396 | B2 | * | 12/2011 | Ono et al. | 524/5 |
| 8,672,028 | B2 | * | 3/2014 | Karcher et al. | 166/277 |
| 2005/0045067 | A1 | | 3/2005 | Naji et al. | |
| 2006/0289163 | A1 | | 12/2006 | Lecolier et al. | |
| 2010/0240556 | A1 | | 9/2010 | Keys et al. | |

FOREIGN PATENT DOCUMENTS

EP 2228804 A1 * 9/2010 ............... H01B 3/14
JP 1-176260 A 7/1989

OTHER PUBLICATIONS

Derwent-Acc-No. 2011-A01867, abstract of Korean Patent Specification No. KR 999438B1 (Dec. 2010).*
International Search Report of PCT/NO2011/000271 dated May 10, 2012.
Norwegian OA (with translation) dated Dec. 21, 2011 Norwegian Patent Appln. No. 20110804.
Norwegian OA (with translation) dated May 22, 2013 Norwegian Patent Appln. No. 20110804.

* cited by examiner

*Primary Examiner* — Anthony J Green
(74) *Attorney, Agent, or Firm* — Lucas & Mercanti, LLP

(57) ABSTRACT

The present invention relates to a current composition for cementing oil or gas wells. The composition comprises calcium aluminate cement in which the proportion of $HC_2O_3$ is at least 50% by weight, dispersant, microsilica, mineral particles, water and optionally a retarder.

27 Claims, 6 Drawing Sheets

CEMENT COMPOSITION BASED ON CALCIUM ALUMINATE CEMENT

CROSS REFERENCE TO RELATED APPLICATION

This Application is a 371 of PCT/NO2011/000271 filed on Sep. 26, 2011, which claims priority of Norwegian Patent Application No. 20110804 filed on Jun. 1, 2011, both applications are incorporated herein by reference in their entirety.

FIELD OF INVENTION

The present invention relates to cementitious compositions and systems, and in particular based on calcium aluminate cement. The invention further extends to the use of said compositions in cementing oil or gas wells or the like.

BACKGROUND ART

When constructing wells such as an oil or gas well a borehole is drilled opening the differently pressured formations to some fluid communications. During the drilling phase a drilling fluid or 'mud' is maintained at a density high enough into the well to prevent communication between the different zones. Once the required depth is reached a steel casing or liner is lowered into the well and cemented into position. Liquid cement is pumped down through the casing and displaced in the annulus between the casing and formation, where it is left to set. This setting process takes a considerable time, for example several hours, typically 24 hours or more. While the cement is setting no further work can be conducted on the borehole to avoid moving the casing while it is being set in position.

Many other oilfield cementing operations such as setting cement plugs, kick-off-plugs or cement squeezes are performed every day with similar cement slurry systems to the one used for primary casing or liner cementing. Traditionally cement systems based on Portland cements are being used. Different qualities of Portland cements have been developed over time to answer the particular needs of oilfield cementing and in particular the temperature and pressure effects on the set of the cement and its performance once set in place. Most typical cement grades are referred as A, G or H types according to the American Petroleum Institute (API).

The drilling operation is a continuous and costly 24 hour a day operation. This is particularly the case on offshore platforms or deepwater operations where very large daily costs are being spent. While drilling runs continuously, the cementing operations require time to set and this is called "wait on cement" (WOC) time for the cement to set hard after displacement into the well. Usually it is good practice to try and minimize this WOC time as much as possible. There is therefore a duality between the need and desire to retard the setting of the cement sufficiently to allow for its safe placement as a liquid into the well so it can adopt the required position, and the need and desire to wait as little time on the cement to set hard for economical reasons.

Portland cement systems have proved efficient for most cementing oilfield operations. Portland cement has nevertheless shown some limitations in some particular well configurations where the resultant very long WOC times made it difficult for the cement to be placed and still become hard (set) along the entire column in an acceptable amount of time. Sometimes the temperature difference between the top of the cement column and the temperature at the shoe is such that the cement never sets at the top of the column. Remedial cement jobs then need to be performed at the expense of further time and money.

Portland cement has a well known limited performance when it comes to set-cement mechanical properties. Not all oil or gas wells show similar configurations and stresses from the wellbore onto the steel casings and cement sheath attached to it are varied. Sometimes the cement used is not hard enough. This performance relates to the 'compressive-strength' of cement. In other well configurations the cement is not ductile enough to both absorb the stress-changes during the life of a well and deform without failure i.e. developing cracks. In these latter conditions, the industry has tried to improve the 'ductility' of the set-cement by lowering its Young's Modulus or modifying its Poisson Ratio.

In some other configurations, it was shown that the failure mode of the set-cement sheath during the life of the well could be attributed to the tensile stresses on the cement sheath. Portland cement systems exhibit sufficiently high compressive strength in most cases to be a suitable material for use in oilfield wells, but it has not been found to be satisfactory in terms of tensile strength or Young's Modulus, Poisson ratio etc.

There is a need to provide cement systems which exhibit better set-cement mechanical properties and do not fail during the life of the well. It would also be advantageous to use systems that require shorter WOC times. This is particularly the case for applications such as cement plugs and kick-off plugs where shorter WOC is paramount as the operations may have to be repeated. It is a known fact that the success ratio of setting e.g. cement kick-off plugs is less than 1 out of 2 performed. Many times, failure to kick-off properly has been attributed to a lack of compressive-strength of the cement placed in the well. Having a cement system that would improve this success ratio by developing higher earlier compressive strength has considerable advantages both in terms of performance and economy.

Failure to place cement properly to provide zonal isolation is sometimes related to the difficulty to retard satisfactorily a cement slurry and achieve at the same time sufficient compressive-strength. Conventional Portland cement systems may be especially sensitive to temperature variations under certain ranges of temperatures like 90-130° C. When a cement system is retarded for temperature in the 120-130° C. range, it has difficulties to set at e.g. 90° C. This over retardation effect is detrimental to zonal isolation and sometimes needs repairs after the primary cementing operation. It is therefore a need for a cement system which has reduced sensitivity to temperature variations compared to traditional Portland based cements.

In the systems of the prior art there are also difficulties encountered with preparing the cement slurries at the location. Typically this has involved mixing the correct ratio of dry cement and a pre-mixed water including desired additional chemicals like retarders, dispersants etc. Achieving the correct density throughout the cement job is a challenge considering the irregular pneumatic flow of the cement blend or other operational considerations. It is therefore a need for a cement system which exhibits less sensitivity to density variations than Portland cement systems.

In systems of the prior art, large fluid loss under borehole condition is commonly experienced, even with a fluid loss additive added to reduce fluid loss, cementing job might fail due to wrong estimation of down hole environment. So there is a need for a cement system with good inherent fluid loss control mechanism, e.g. closed particle packing to form dense filter cake, thereby stopping fluid loss.

DESCRIPTION OF INVENTION

According to the present invention, there is provided a cement composition comprising calcium aluminate cement in which the proportion of $Al_2O_3$ is at least 50% by weight, a dispersant, microsilica, and mineral particles water and optionally a retarder.

The cement composition of the present invention, based on calcium aluminate cement, makes it particularly fit for cement plugs applications, wells that require very high compressive-strength and also when modified for more 'flexibility', wells demanding very high tensile strength and lower Young's Modulus. Since the system is based on calcium aluminate cement it is able to set at very low temperatures, which makes the system fit for use under deepwater conditions or cold conditions such as can be found in cold countries, e.g. Canada, for example. Since the system is calcium aluminate based it is also inherently more resistant to $H_2S$ and/or $CO_2$ injection conditions or presence and also shows good acid resistance to weak acids (organic acids. e.g. acetic, formic acids). The cement according to the present invention may set at a temperature in the range −2 to 200° C. making it suitable for use in a range of environments. At the lower end of this range of temperatures, it is necessary to add a curing accelerator to the system before it is poured and placed. The accelerator (when present) may be selected from the group of compounds consisting of lithium hydroxide, lithium carbonate, lithium sulfate, lithium chloride, lithium nitrate, calcium hydroxide, potassium hydroxide, potassium carbonate, sodium hydroxide, sodium carbonate, sodium sulfate and very dilute sulfuric acid. The accelerator may be present in a concentration in the range 0.01-1% by weight.

The cement composition can be used for all types of oilfield cementing operations (primary, remedial, etc) but is particularly fit for use in the following circumstances: cement plugs (kick-off and "plug and abandonment" (P&A)), multilateral junctions, deepwater and cold environments, acid resistance, $CO_2$ and $H_2S$ presence, thermal cementing. These cement compositions could also be used outside of the oil field cementing applications, in other situations where a quick set time is desirable such as airfield strip repair or injection and repair of refractory materials like crucible or others.

In the cement composition of the present invention, the calcium aluminate cement may be present at a concentration in the range 15-60% (or 35-50%) by weight of the dry components.

The dispersant may be selected from the group consisting of sodium phosphates salts. In particular, the dispersant may be selected from sodium hexa metaphosphate (SHMP), sodium tripolyphosphate (STPP), and sodium trimetaphosphate (STMP) or combinations thereof. The use of SHMP is preferred. The dispersant may be present at a concentration in the range 0.05-0.5% (or 0.05-0.4%, or 0.2-0.5%) by weight of the dry components.

The term "microsilica" used in the specification and claims of this application is particulate, amorphous $SiO_2$ obtained from a process in which silica (quartz) is reduced to SiO-gas and the reduction product is oxidised in vapour phase to form amorphous silica. Microsilica may contain at least 70% by weight silica ($SiO_2$) and has a specific density of 2.1-2.3 g/cm$^3$ and a surface area of typically 15-40 m$^2$/g (BET). The primary particles are substantially spherical and have an average size of about 0.15 µm. Microsilica is preferably obtained as a co-product in the production of silicon or silicon alloys in electric reduction furnaces. In these processes large quantities of microsilica are formed. The microsilica is recovered in conventional manner using baghouse filters or other collection apparatus. The microsilica used in the present invention may be MS grade 971 or MS grade 968 as sold by Elkem AS. Alternatively, amorphous silica stemming from fusion of zircon sand may also be used. Such silica has a similar morphology to microsilica, but may have a somewhat lower specific surface area, e.g. 5-15 m$^2$/g (BET).

The use of the microsilica improves the particle packing which in turn results in good mechanical properties of the dry cement. In use, the slurry obtained when the cement is mixed with water has improved rheological properties when compared with cement slurries of the prior art.

The microsilica may be present in the range 10-35% (or 20-35%) by weight of the dry components.

Mineral particles with a particles size less than 500 µm can be added as filler, which also or further improves particle packing and mechanical properties. Those particles can be selected from silica flour (ground crystalline silica), alumina fines with a mean particle size of about 25 µm. The mineral particles in the present invention may be present in the range 0-45% (or 5-30%) by weight of the dry components.

The combination of particles with different sizes from cement, minerals and microsilica will result in the most closed particle packing, thus giving the cementing system good inherent fluid loss control and improved mechanical properties at the same time.

The retarder may be selected from the group consisting of hydroxycarboxilic acids such as citric, tartaric, gluconic acids and their salts, boric acid and its salt, sodium chloride, sodium nitrate, ethylenediamine, tetraacetic disodium salt, potassium sulfate and potassium chloride. The use of citric acid is preferred. The retarder may be present in the range 0-1% (or 0.001-1%) by weight of the dry components.

The cement composition of the present invention may additionally further comprise hollow microspheres. These can be added to control the cement density and make it lighter. Adding hollow microspheres increases cement porosity and as such affect the strength (both compressive and tensile) of the cement formed. The hollow microspheres may be glass microspheres, such as those sold under the trade mark 3M™ Scotchlite™ from 3M, or Cenosphere. The hollow microspheres may be present in the range 0-30% (or 15-25%) by weight of the dry components.

Alternatively, or in addition, the cement composition may additionally further comprise one or more fibres. Again, these may be added to affect the final properties of the cement formed. The fibre may be a plastic fibre or cellulose. Examples of plastic fibres which may be used include polypropylene, polyvinyl acetate and polyethylene. The fibre may be present in the range 0-5% (or 1-3%) by weight of the dry components.

The composition may also additionally further comprise weighting agents. These may be added to control the density of the cement. Examples of suitable weighting agents include: barite, hematite, siderite, dolomite, manganomanganic oxide, ilmenite and calcium carbonate. The weighting agent may be present in the range 0-70% (or 0-5%) by weight of the dry components.

In some instances it is desirable for the cement to have some degree of ductility to allow it to absorb stress changes during the life of the well and to deform without cracking, when swapping fluids of different densities in the well, or when producing hydrocarbons. In those instances, the cement composition may additionally further include an elastomeric powder. Examples of an elastomeric powder which may be used are Ecorr RNM45(RTM) a rubber powder sold by Vredestein Rubber Recycling BV of the Netherlands and Eliokem XRP-046(RTM) a surface modified pre-crosslinked copolymer of butadiene-acrylonitrite partitioned with calcium carbonate sold by Eliokem Holding Corporation of France. The elastomeric powder may be present in the range 0-6% (or 0.15-0.3%) by weight of the dry components.

In some operations such as P&A (plug and abandonment) cement plugs, it is most of the time necessary to bring to a producing platform a mixing cementing unit to perform the operation. Since the system presented here exhibit a dormant period up to several weeks, we can expect the P&A operations (as well other cementing operations) to be considerably improved logistically as no mixing on-site will be needed. Already prepared cement slurry may be transported as a pre-mix liquid form to the platform and pumped using a simple pump. The quality of the cement slurry will also be guaranteed with this new system, as the slurry may be formed in a controlled environment where it can be subjected to quality control before it is sent out to a particular location.

DETAILED DESCRIPTION OF THE INVENTION

The invention will be illustrated in more detail with reference to the following non-limiting examples with accompanying figures.

EXAMPLES

Three different types of cement according to the present invention were prepared, one for high strength applications, one for use when a "flexible" cement is needed and one for situations where it is necessary to have a light-weight cement, for example with a specific gravity of 1.46 or less. Examples of each of these three formulations of cements are given in table 1 below.

TABLE 1

|  | High-strength | Flexible | Light-weight |
| --- | --- | --- | --- |
| Calcium Aluminate Cement (Secar 71) | 43 | 43 | 40 |
| Microsilica (MS971) | 29 | 26 | 29 |
| Silica flour (Sibelco M 10) | 28 | 22 | 12 |
| Glass Microsphere (3M-S-60HS) |  | 4 | 19 |
| Rubber powder (Ecorr RNM45) |  | 5 |  |
| Dispersant (SHMP)** | 0.217 | 0.217 | 0.217 |
| Retarder (Citric acid)** | 0.40 | 0.40 | 0.40 |
| Water vol %* | 32 | 35 | 32 |
| Green density (g/cm$^3$) | 2.10 | 1.76 | 1.40 |

*vol % in total mix
**wt % based on the dry mix (cement, Microsilica, silica flour)
MS971 from Elkem AS
3M-S-60HS from 3M Each of the three cements prepared were then tested for their rheological properties including Plastic Viscosity (PV), Yield Point (YP) and flow at different rpm. The cements must have properties which enable them to be poured as a slurry to the desired location and then be able to set as quickly as possible. The pumping time may be anything from 2 to 5 hours at temperatures from 25-130° C., for example. To be effective it is desirable to have a PV of 300 cP or less and a YP of 50 lb/100 ft$^2$ or less at a solid loading of approximately 60% vol. Details for the three example cements are given in Table 2 below.

TABLE 2

| Reading (dial) | High-strength | Flexible | Light-weight |
| --- | --- | --- | --- |
| 300 rpm | 178 | 144 | 300 |
| 200 rpm | 113 | 107 | 239 |
| 100 rpm | 83 | 62 | 128 |
| 60 rpm | 57 | 47 | 83 |
| 30 rpm | 28 | 32 | 48 |
| 6 rpm | 23 | 15 | 14 |
| 3 rpm | 24 | 11 | 9 |
| PV (cP) | 191 | 123 | 258 |
| YP (lb/100 ft$^2$) | 49.5 | 21.0 | 42.0 |

A key property of the cements of the present invention is the setting time and, in particular, the Wait-on-cement time (WOC). These should both be as short as possible without compromising the strength of the formed cement plug. The setting time is defined as the time taken from the end of pouring in the cement slurry until it has a strength of 50 psi. The WOC time is then the length of time from the end of pouring in the cement slurry to the point where the cement has a strength of 500 psi. Table 3 gives details of the setting time and the WOC time, and compressive strength development of the three examples of cement of the present invention from an SGSA (Static Gel Strength Analyzer)) measurement.

Figure 1:
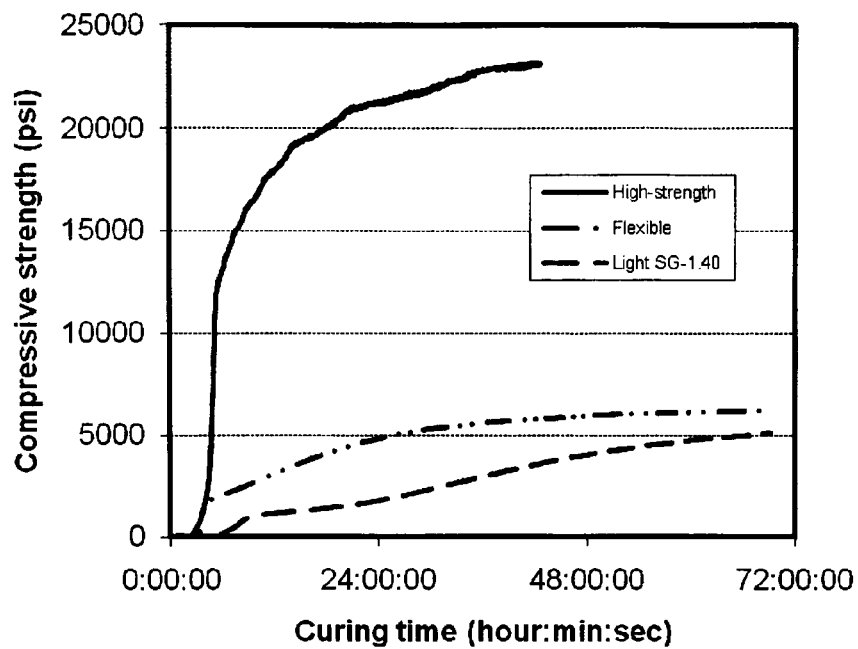
FIG. 1 shows a diagram for compressive strength development versus time for the three examples of cement compositions.

FIG. 1 shows a diagram for compressive strength development versus time for the three examples of cement compositions.

TABLE 3

|  | High-strength | Flexible | Light-weight |
| --- | --- | --- | --- |
| Setting time (h:min:sec) | 02:29:30 | 03:17:00 | 05:14:30 |
| WOC (h:min:sec) | 03:07:30 | 03:30:00 | 07:34:30 |
| 12 hr strength (psi) | 17933 | 3112 | 1147 |
| 24 hr strength (psi) | 21274 | 4850 | 1784 |
| 42 hr strength (psi) | 23070 | 5830 | 3578 |
| 64 hr strength (psi) |  | 6259 | 5139 |

A comparison of the high strength cement of the present invention with two commercially available cement plugs based on Portland cement is given below in table 4.

TABLE 4

|  | High-strength | Ref 1 | Ref 2 |
|---|---|---|---|
| WOC (h:min:sec) | 3:07:30 | 16:24:00 | 49:11:00 |
| 12 hr strength (psi) | 15202 | 0 | 0 |
| 24 hr strength (psi) | 17933 | 6096 | 0 |
| 42 hr strength (psi) | 21274 | ~7900 | ~6000 |

Figure 2:
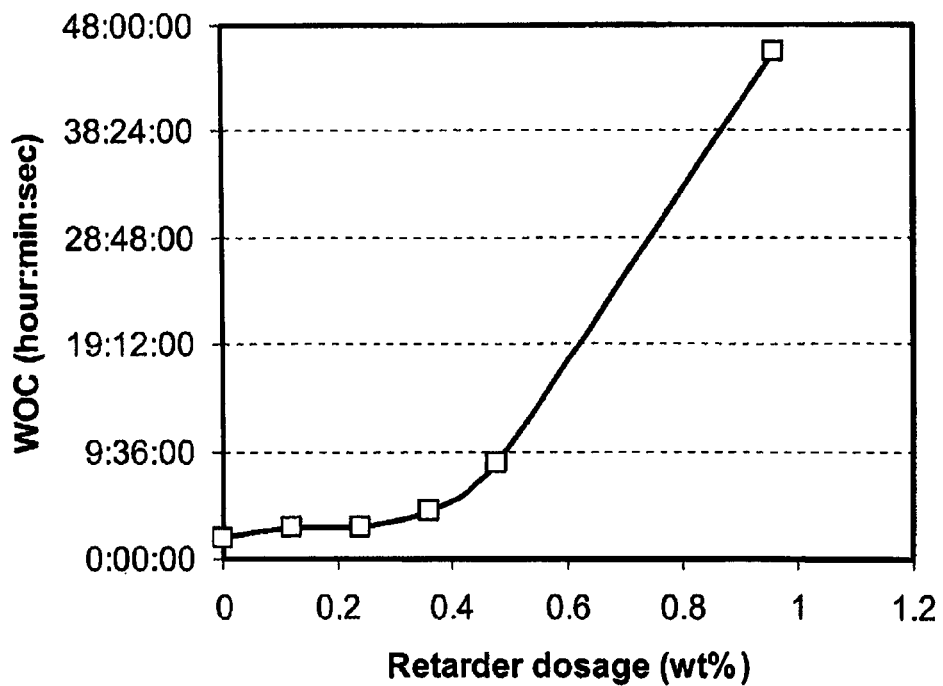
FIG. 2 shows the effect of the WOC time of varying quantity of retarder included in the cement.

FIG. 2 shows the effect on the WOC time of varying the quantity of retarder (citric acid in these examples) included in the cement. A high-strength cement was used for the tests. As can be seen from FIG. 2, increasing the dosage of the retarder above about 0.5 wt % based on the dry mix starts to significantly increase the WOC time. However, for values under 0.5 wt % then the WOC time is less than 10 hours, which is a significant improvement on the prior art cements.

Table 5 below gives the results of tests of the mechanical properties of the different examples of the present invention, and in particular, the strengths (both tensile and compressive) as well as the Young's Modulus. In some circumstances it is necessary for the cement to have sufficiently high tensile strength as well as compressive strength.

TABLE 5

|  | Tensile | | Compressive Strength | | Young's Modulus | |
|---|---|---|---|---|---|---|
|  | MPa | psi | MPa | psi | GPa | M psi |
| High-strength | 7.33 | 1062.9 | 162 | 23490 | 25.2 | 3.65 |
| High-strength with fibre* | 8.00 | 1160.3 | 122.1 | 17709 | 18.5 | 2.68 |
| Flexible | 4.08 | 591.8 | 28.1 | 4076 | 6.0 | 0.87 |

*0.05% polypropylene fibre and 4% microspheres were added to see what effect this had on the Young's Modulus As can be seen from the data above, the addition of a fibre to the high-strength cement results in an improvement in the Young's Modulus while still maintaining the strength properties.

Details of the Compression testing procedure are as follows.

Cement slurries according to the invention were prepared and prior to moulding the slurry containers were shaken by hand. The compositions of the cement slurries are shown in Table 6.

TABLE 6

|  | 6 | 7 |
|---|---|---|
| Calcium aluminate cement, Secar 71% | 43 | 43 |
| Microsilica, MS971 | 26 | 29 |
| Silica flour (Sibelco M 10) | 22 | 23.5 |
| Glass microsphere (3M-S-60HS) | 4 | 4 |
| PP-fiber |  | 0.5 |
| Rubber Powder (Ecorr RNM45) | 5 |  |
| Dispersant (SHMP) | 0.217 | 0.217 |
| Retarder (Citric acid) | 0.40 | 0.40 |
| Water wt %* | 25.00 | 20.00 |
| Green density (g/cm3) | 1.76 | 1.86 |

The test samples were moulded using plastic cylinders (5×10 cm) equipped with a lid. The cylinders were placed in a water filled steel cylinder at a pressure of ~210 bar (3000 psi) in a heating cabinet. The temperature was set to 80° C. and the samples were left to cure for 5 days. A uniform temperature in the heating cabinet was reached after ~6 hours. Prior to testing the samples were cut at both ends to get a plane surface.

The E-modulus was measured using a Zwick Z020. This is an instrument having a compression force limit of 20 kN. For the E-modulus measurements a preload of 50 N was applied. The load was then increased to 10 kN. The E-modulus reported is calculated based on the measured compression from 5 to 10 kN. The load was then reduced to 50 N prior to an increase to 20 kN. Again the E-modulus named E-hysteresis was measured between 5 and 10 kN. The E-hysteresis values are found to be reduced compared to the E-modulus values. However, they are reported to give a more accurate value of the E-modulus.

Figure 3:
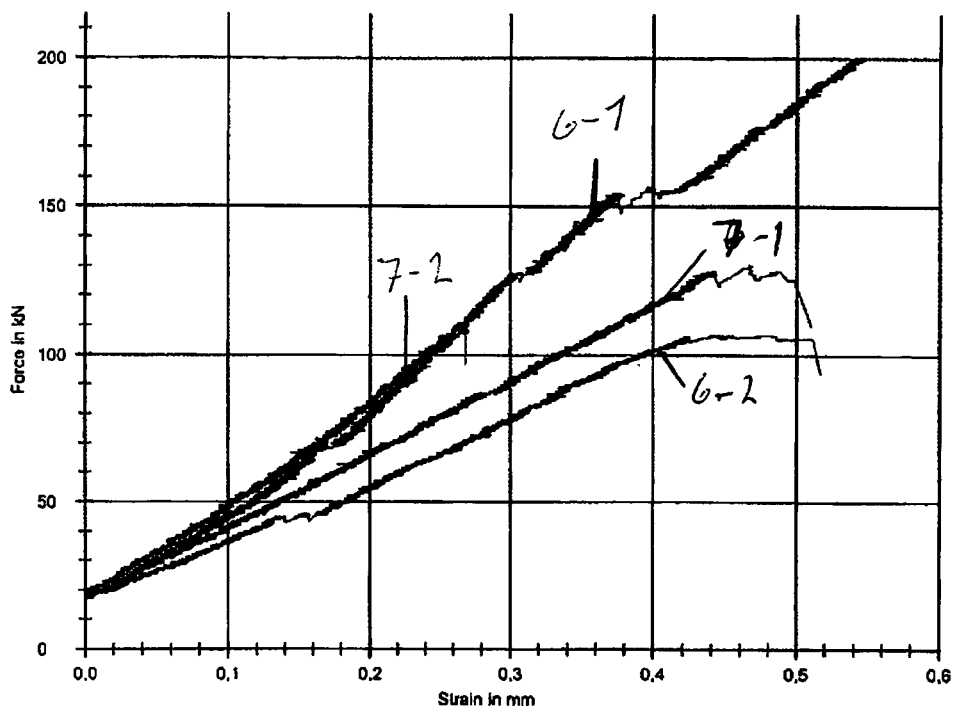
FIG. 3 show the loads where the first sign of crack development for each sample 6-1, 6-2, 7-1 and 7-2 can be detected.

For the compression strength measurements a ToniTechnik was used with an upper limit of 3000 kN. As the samples did not go asunder but could take increasing load after cracks started to develop the values reported as compression force in table 7 below are taken from the curves in FIG. 3 and they are the loads where the first sign of crack development for each sample can be detected in the graph.

TABLE 7

|  | Sample: 6-1 | Sample: 6-2 | Sample: 7-1 | Sample: 7-2 |
|---|---|---|---|---|
| E-modulus | 647 MPa | 716 MPa | 704 MPa | 706 MPa |
|  | 0.094 Mpsi | 0.104 Mpsi | 0.102 Mpsi | 0.102 Mpsi |
| E-hysteresis | 545 MPa | 657 MPa | 609 MPa | 643 MPa |
| Compression: |  |  |  |  |
| Force | 87 kN | 45 kN | 69 kN | 95 kN |
| Area | 2067 mm² | 2059 mm² | 2023 mm² | 2043 mm² |
| Compression strength: | 42.1 N/mm² | 21.9 N/mm² | 34.1 N/mm² | 46.5 N/mm² |
|  | 6107 psi | 3177 psi | 4947 psi | 6746 psi |

Details of the tensile strength testing procedure are as follows. This is also known as the Brazilian testing method.

The mixing procedure and preparation of the test samples was the same as that described for the compression test above.

The samples were tested in the Zwick Z020 apparatus. Although sample 6-3 was found to crack at a load of 10282 N it did not go asunder and could still hold a load of 20 kN. Sample 7-3 did hold a load of 20 kN and was thus also tested in the ToniTechnik testing machine. Here the reported load is lower than 20 kN which could be due to the sample being compressed a second time.

Figure 4:
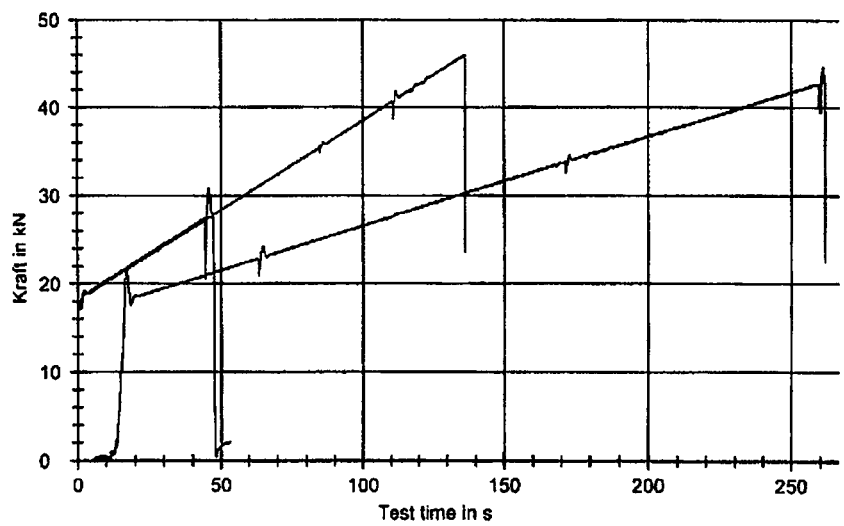
FIG. 4 show the loads where the first sign of crack development for each sample 6-3, 6-4, 7-3 and 7-4 can be detected.

Again using the ToniTechnik the results reported in table 8 below are taken from FIG. 4, being the loads where the first sign of crack development for each sample can be detected.

TABLE 8

|  | Sample: 6-3 | Sample: 6-4 | Sample: 7-3 | Sample: P 7-4 |
|---|---|---|---|---|
| Load: | 10282N | 19500N | 19500N | 21000N |
| Preload: | 72N | 95N | 95N | 95N |
| Total load (P): | 10354N | 19595N | 19595N | 21095N |
| Sample dim.: |  |  |  |  |
| Radius, R: | 25.65 mm | 25.6 mm | 25.45 mm | 25.4 mm |
| Length, t: | 93.4 mm | 92.9 mm | 92.5 mm | 93.6 mm |
| $\pi Rt$: | 7526 mm$^2$ | 7471 mm$^2$ | 7395 mm$^2$ | 7469 mm$^2$ |
| Indirect tensile strength, $\sigma_t = P/(\pi Rt)$: | 1.38 N/mm$^2$ | 2.62 N/mm$^2$ | 2.65 N/mm$^2$ | 2.82 N/mm$^2$ |

Consistometer Testing of Sample 6 and 7:

As for the strength tests, the cement slurries were prepared and prior to moulding the slurry containers were shaken by hand. The slurries were placed in the HTHP-consistometer at a pressure of ~210 bar and at ambient temperature for sample 6 and 7-1. For sample 7-2 the starting temperature of the consistometer was set at 35° C. After placing of samples the temperature of the consistometer was set to 80° C.

Figure 5:
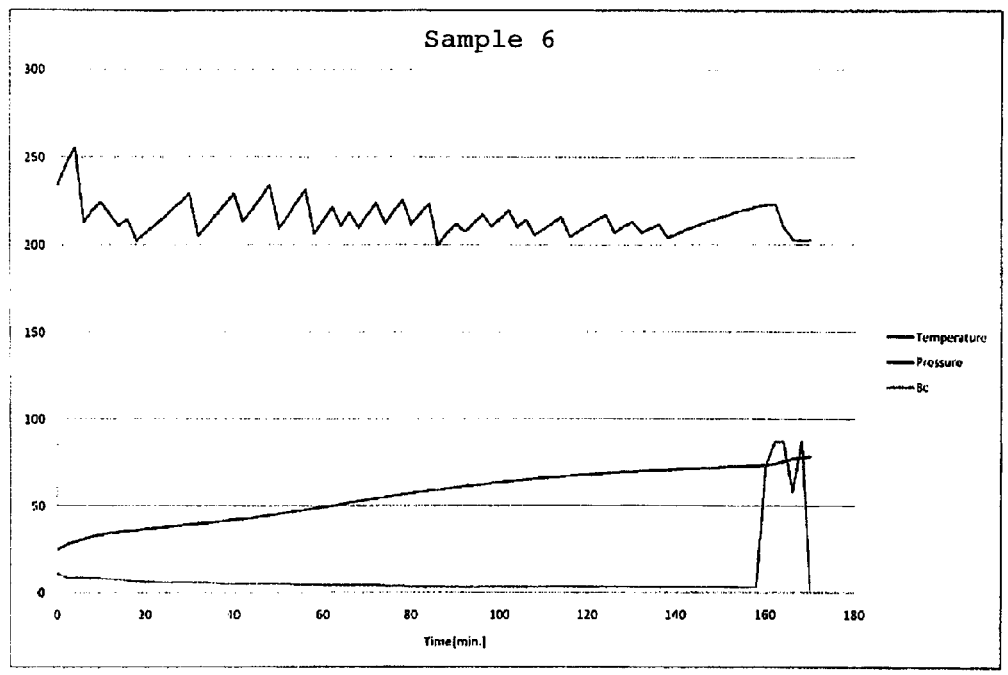
FIG. 5 shows the consistometer testing of sample 6.
Figure 6:
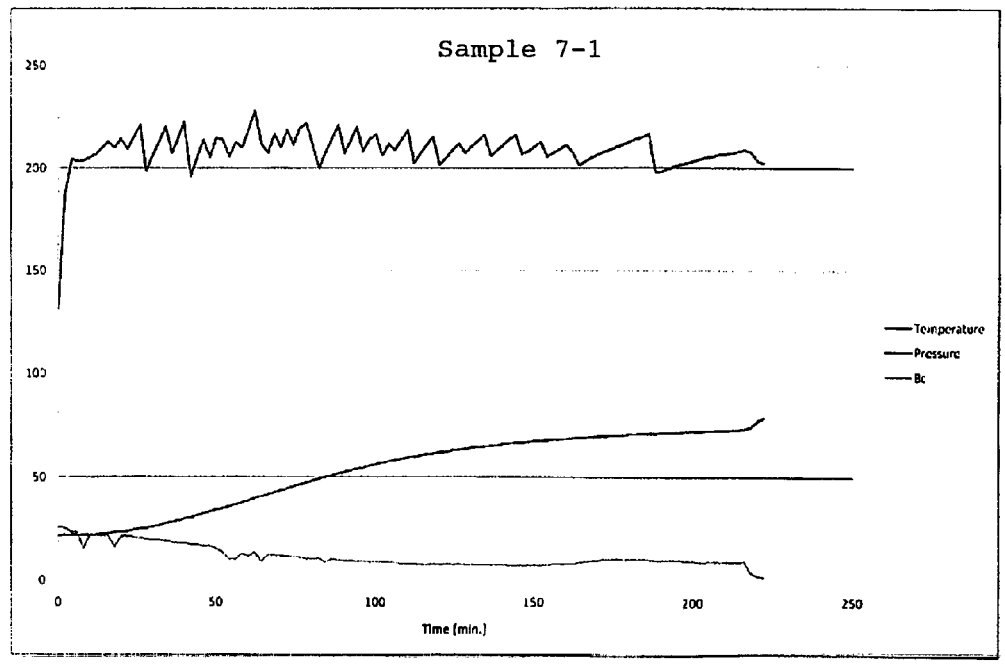
FIG. 6 shows the consistometer testing of sample 7-1.
Figure 7:
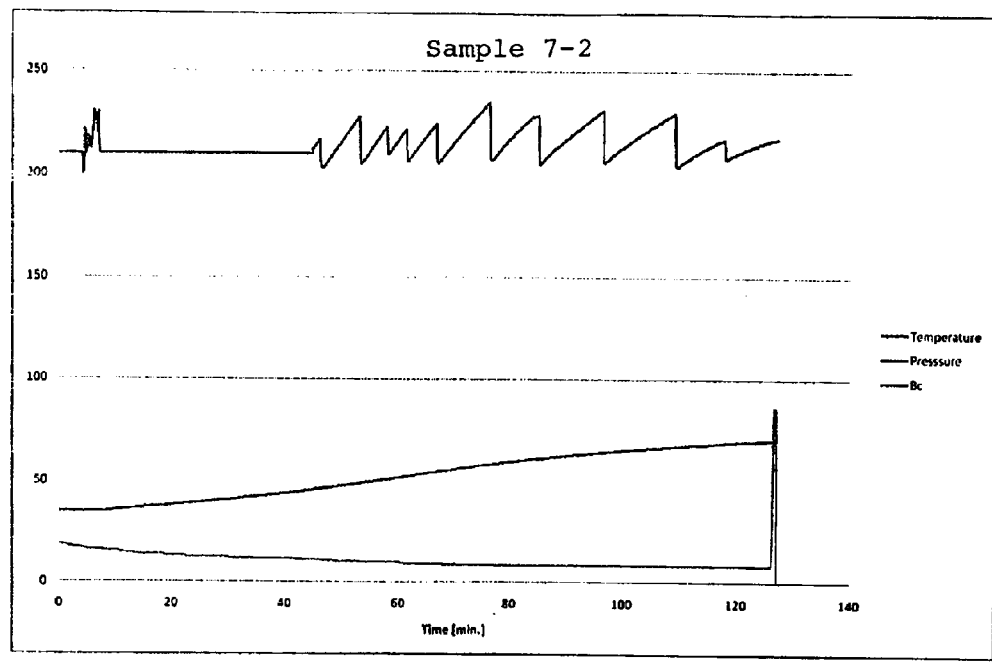
FIG. 7 shows the consistometer testing of sample 7-2.

The temperature measured when the cracking is found to be starting has been reported in table 9 below. The time steps set between logging points were 2 minutes when running sample 6 and 7-1. Due to this and a very rapid setting the setting time for sample 7-1 was almost missed thus, sample 7-2 was run a second time using a logging interval of 5 seconds. During the first 45 minutes of the pressure logging and 8 minutes of the temperature logging when running sample 7-2 the communication between the sensors failed. Thus, for these times manually logged values are reported and can be seen as straight lines. These are shown in FIGS. 5 to 7 respectively. When dismantling the testing container after testing samples 7 it was found that fibres had clung to the vanes of the static paddle.

TABLE 9

|  | Sample: 6 | Sample: 7-1 | Sample: 7-2 |
|---|---|---|---|
| Setting temperature: | 73° C. | 69° C. | 70° C. |

The cements of the present invention have been found to be stable in storage in slurry form with little or no loss in properties when subsequently tested. A sample of the high-strength cement was split into 2 and a first part was tested and the second part was stored in a closed box for one week. The second part was then removed and tested and the results for both tests are given in table 10 below.

TABLE 10

|  | Fresh mix | One week old |
|---|---|---|
| PV (cP) | 103.5 | 178.5 |
| YP (lb/100 ft$^2$) | 77.5 | 23.5 |
| Setting time (h:min:sec) | 05:53:00 | 04:58:00 |
| WOC (h:min:sec) | 6:54:00 | 5:44:00 |
| 8 hr strength (psi) | 2160 | 7740 |
| 12 hr strength (psi) | 10409 | 12130 |
| 24 hr strength (psi) | 17061 | 17171 |
| 42 hr strength (psi) | 20317 | 19653 |

Figure 8:
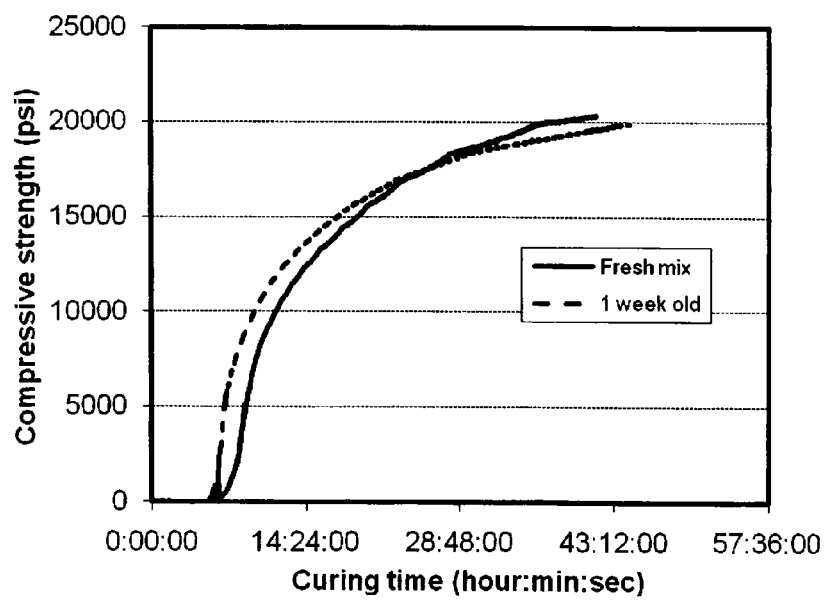
FIG. 8 shows the compressive strength progression with time of the fresh mix of high-strength cement according to the invention and of the 1 week old high-strength cement according to the invention.

FIG. 8 shows graphically the compressive strength progression with time of the two samples and it can be seen that the curves follow each other very closely.

Figure 9:
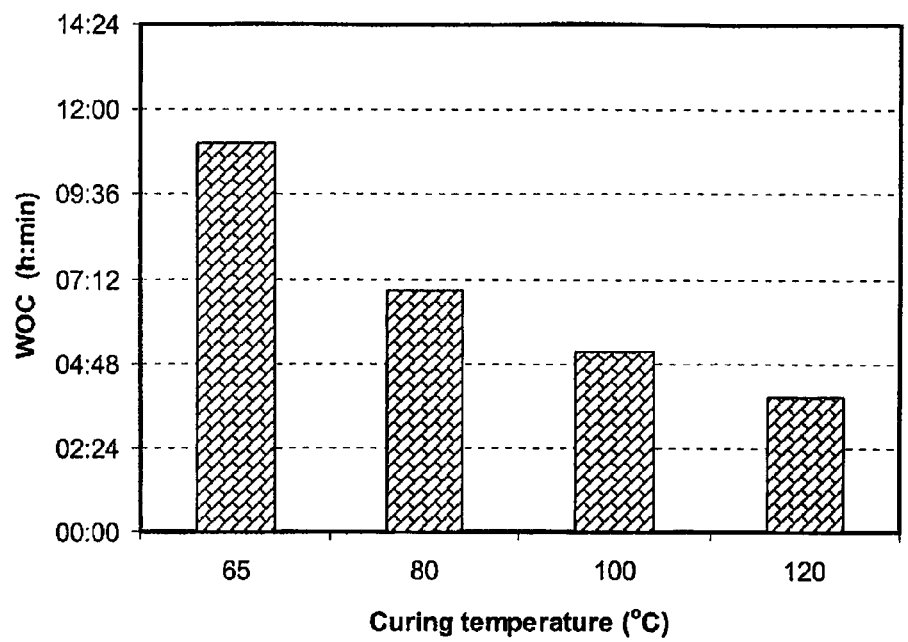
FIG. 9 shows the WOC time for a cement according to the invention.
Figure 10:
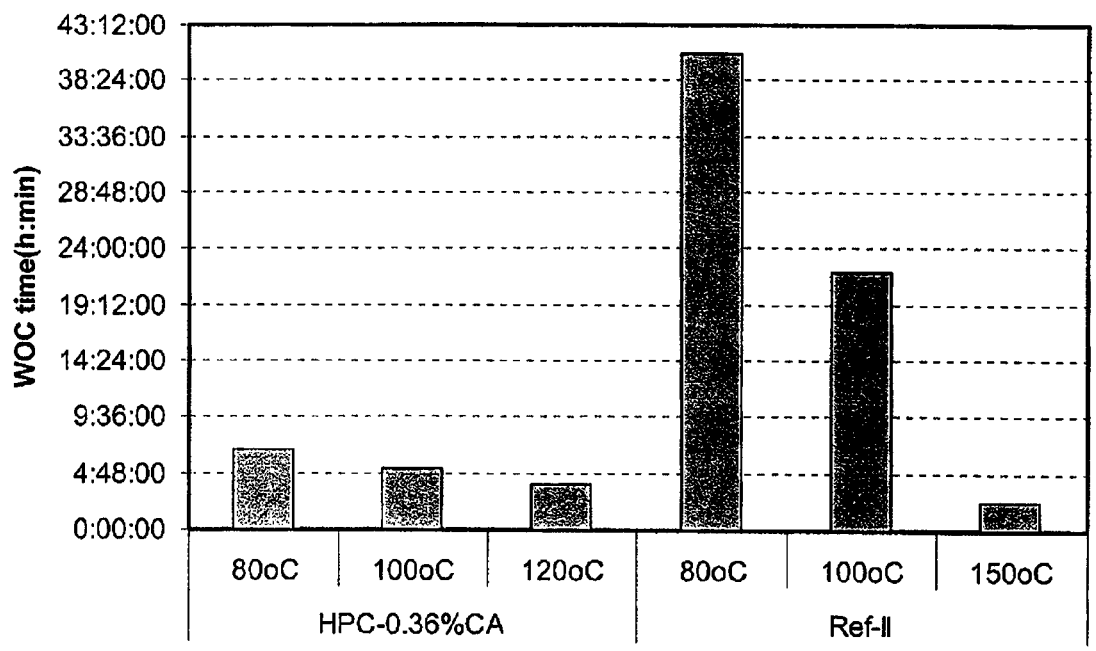
FIG. 10 shows the variation with respect to temperature for a cement according to the invention and for a cement according to prior art.
Figure 11:
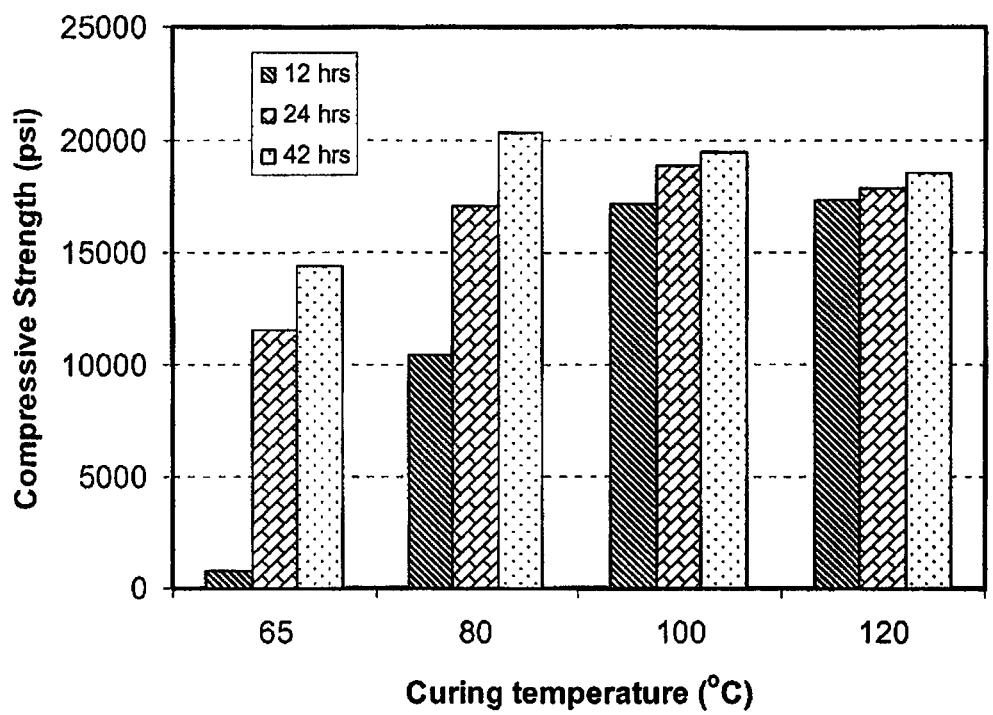
FIG. 11 shows that any variations in compressive strength obtained at different temperatures substantially reduce with increasing time.

The cements of the present invention show significantly less variation in response to temperature changes than the cements of the prior art. Firstly, referring to FIG. 9, the WOC time for a cement of the present invention has some variation with temperature. As the temperature is increased the WOC time decreases. However, referring to FIG. 10, it can be seen that the variation with respect to temperature is significantly less than that which is present for prior art cements. Further, looking at FIG. 11, it can be seen that any variations in compressive strength ultimately obtained at different temperatures substantially reduce with increasing time. The cements of the present invention which were tested for FIGS. 9, 10 and 11 had the same composition with constant retarder concentration so the effects are due to the difference in temperature.

Light-weight Cement

The effect of including glass bubbles to reduce the density of the cement is shown in the table 11 below. The rheological properties, the WOC time and the final strength are all still acceptable for use in many applications. The final strength of 4500 psi or higher is very good and the WOC time of less than 12 hours for all samples and considerably less in most samples is a substantial improvement on the prior art.

TABLE 11

|  | Sample label | | | |
|---|---|---|---|---|
|  | 1 | 2 | 3 | 4 |
| Specific gravity of slurry | 1.65 | 1.59 | 1.45 | 1.40 |
| PV (cP) | 192 | 165 | 234 | 258 |
| YP (lb/100 ft$^2$) | 19 | 20 | 22 | 42 |
| WOC (h:min:sec) | 3:07:00 | 03:19:30 | 10:14:30 | 07:34:30 |
| 12 hr strength (psi) | 2898 | 2252 | 977 | 1147 |
| 24 hr strength(psi) | 4375 | 3574 | 1967 | 1784 |
| 42 hr strength (psi) | 6155 | 5396 | 3840 | 3578 |
| 62 hr strength (psi) | 6366* | 6318 | 4883 | 5139 |

Flexible Cement

In an embodiment of the invention, elastomer or rubber is added to the cement mix to make it more flexible so that it can react to movement over time (perhaps as a result of temperature variations) without cracking and failing. As can be seen from the results in table 12 below, the rheological properties, the WOC time and the final compressive strength are good.

TABLE 12

|  | XRP046-5% | RNM45-5% |
|---|---|---|
| Time to 50 psi (h:min:sec) | 03:09:30 | 3:17:00 |
| Time to 500 psi (h:min:sec) | 4:11:30 | 03:30:00 |
| 12 hr Strength (psi) | 1059 | 3112 |
| 24 hr Strength (psi) | 2480 | 4850 |
| Final Strength (42 hr, psi) | 3678 | 5830 |

Thickening Time

Figure 12:
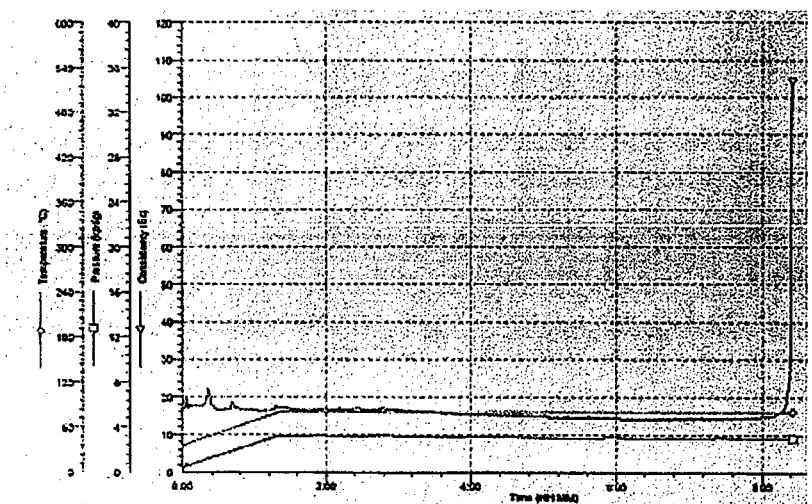
FIG. 12 shows the very rapid increase in strength after the setting time of the cements according to the invention.

The cements of the present invention show a very rapid increase in strength after the setting time. This is important as it minimises gas migration out through the cement as it is setting and potentially causes weaknesses within the cement. Looking at FIG. 12, it can be seen that there is an abrupt right angle set at around 8.5 hours (for this sample).

Density Variation

The cements of the present invention are much less sensitive to the variations in density arising from the amount of water added to the cement mix. Table 13 below shows that varying the water by a substantial amount (up to 20% more or less) has a manageable effect on the WOC time and final strength of the cement. The final strength of more than 10000 psi even with an excess of 20% too much water is very good. Portland cement based systems are not very tolerant and vary substantially with water content.

TABLE 13

| Viscosity | −10% mix water | 100% mix water | +20% mix water |
|---|---|---|---|
| PV |  | 103.5 | 93 | 64.5 |
| YP |  | 77.5 | 57 | 30.5 |
| 80 deg C. |  |  |  |
| Time to 50 psi (h:min:sec) | 05:53:00 | 8:37:00 | 08:24:00 |
| Time to 500 psi (h:min:sec) | 6:54:00 | 8:37:00 | 11:23:00 |
| 8 hr Strength (psi) | 2160 | 5 | 2 |
| 12 hr Strength (psi) | 10409 | 5180 | 943 |
| 24 hr Strength (psi) | 17061 | 13058 | 7741 |
| Final Strength (42 hr, psi) | 20317 | 16344 | 10389 |

Fluid Loss

A test to measure the fluid loss of the cements over time may be conducted as follows. A test cell is prepared according to API specifications. The cell is preheated to the desired temperature. When the cell has reached the desired temperature, the heat is turned off and the cell is loaded with the fluid sample. After closure of the cell, it is placed back into the heating jacket and secured. The sample is put under pressure which is maintained until the desired temperature has been reached and it has stabilized. The heating time of the sample should never exceed 1 hour. The upper and lower limits of the test pressure differential are determined by the test temperature.

When the fluid reaches the desired test temperature, the pressure on the top of the sample is increased to 500 psi more than the backpressure. A valve at the bottom is part opened to initiate filtration. The filtrate is collected for 30 min maintaining the selected test temperature +/−3° C. At the end of the test, the valves are closed and the cell is sealed. The system is allowed to cool and all final filtrate is collected. The top of the cell is removed and the sample is discarded and the filter cake is retrieved. This is carefully scraped off the soft top layer of the filter cake and the thickness is measured.

A fluid loss test of the high-strength cement composition of Table 1 was done without any fluid loss additives with back pressure of 1000 psi at 60° C. The result showed 28 ml fluid loss, filter cake of 30 mm and no free water, indicating that the composition has excellent natural fluid loss control.

The invention claimed is:

1. A cement composition for cementing oil and gas wells comprising:
   35-50% by weight of dry components of calcium aluminate cement in which the proportion of $Al_2O_3$ is at least 50% by weight,
   dispersant,
   20-25% by weight of dry components of microsilica,
   5-30% by weight of dry components of mineral particles selected from the group consisting of silica flour and alumina,
   water, and
   optionally a retarder.

2. The cement composition as claimed in claim 1, in which the dispersant is selected from the group consisting of sodium phosphate salts.

3. The cement composition as claimed in claim 2, in which the dispersant is selected from the group consisting of sodium hexa metaphosphate (SHMP), sodium tripolyphosphate (STPP), sodium trimetaphosphate (STMP) and combinations thereof.

4. The cement composition as claimed in claim 1, in which the dispersant is present at a concentration in the range 0.05-0.4% by weight of the dry components.

5. The cement composition as claimed in claim 4, in which the dispersant is present at a concentration in the range 0.2-0.5% by weight of the dry components.

6. The cement composition as claimed in claim 1, in which the retarder is selected from the group consisting of hydroxycarboxilic acids.

7. The cement composition as claimed in claim 6, wherein the hydroxycarboxilic acids is selected from the group consisting of citric, tartaric, gluconic acids and their salts, boric acid and its salt, sodium chloride, sodium nitrate, ethylenediamine, tetraacetic disodium salt, potassium sulfate and potassium chloride.

8. The cement composition as claimed in claim 7, in which the retarder is citric acid.

9. The cement composition as claimed in claim 1, in which the retarder is present in the range 0-1% by weight of the dry components.

10. The cement composition as claimed in claim 9, in which the retarder is present in the range 0.001-1% by weight of the dry composition.

11. The cement composition as claimed in claim 1, in which the composition further comprises hollow microspheres.

12. The cement composition as claimed in claim 11, in which the hollow microspheres are glass microspheres or cenospheres.

13. The cement composition as claimed in claim 11, in which the hollow microspheres are present in the range 0-30%, by weight of the dry components.

14. The cement composition as claimed in claim 1, in which the composition further comprises fiber.

15. The cement composition as claimed in claim 14, in which the fiber is selected from the group consisting plastics and cellulose.

16. The cement composition as claimed in claim 15, in which the plastic fiber is selected from the group consisting of polypropylene, polyvinyl acetate and polyethylene.

17. The cement composition as claimed in claim 14, in which the fiber is present in the range 0-5% by weight of the dry components.

18. The cement composition as claimed in claim 1, in which the composition further comprises weighting agents.

19. The cement composition as claimed in claim 18, in which the weighting agents are selected from the group consisting of barite, hematite, siderite, dolomite, manganomanganic oxide, ilmenite and calcium carbonate.

20. The cement composition as claimed in claim 18, in which the weighting agent is present in the range 0-70% by weight of the dry components.

21. The cement composition as claimed in claim 1, in which the composition further comprises an elastomeric powder.

22. The cement composition as claimed in claim 21, in which the elastomeric powder is selected from the group consisting of rubber powder and surface modified pre-crosslinked copolymer of butadiene-acrylonitrite partitioned with calcium carbonate.

23. The cement composition as claimed in claim 21, in which the elastomeric powder is present in the range 0-6% by weight of the dry components.

24. The cement composition as claimed in claim 11, in which the hollow microspheres are present in the range 15-25% by weight of the dry components.

25. The cement composition as claimed in claim 14, in which the fiber is present in the range 1-3% by weight of the dry components.

26. The cement composition as claimed in claim 18, in which the weighting agent is present in the range 0-5% by weight of the dry components.

27. The cement composition as claimed in claim 21, in which the elastomeric powder is present in the range 0.15-0.3% by weight of the dry components.

\* \* \* \* \*